May 6, 1952    J. W. SLATER    2,595,309
FLIGHT CONTROL APPARATUS FOR AIRCRAFT
Filed June 26, 1946    4 Sheets-Sheet 1

INVENTOR
JOHN M. SLATER
BY
Herbert H. Thompson
his ATTORNEY.

May 6, 1952   J. W. SLATER   2,595,309
FLIGHT CONTROL APPARATUS FOR AIRCRAFT
Filed June 26, 1946   4 Sheets-Sheet 2

INVENTOR
JOHN M. SLATER
BY
Herbert H. Thompson
his ATTORNEY.

May 6, 1952  J. W. SLATER  2,595,309

FLIGHT CONTROL APPARATUS FOR AIRCRAFT

Filed June 26, 1946  4 Sheets-Sheet 3

INVENTOR
JOHN M. SLATER
BY
ATTORNEY

May 6, 1952  J. W. SLATER  2,595,309
FLIGHT CONTROL APPARATUS FOR AIRCRAFT
Filed June 26, 1946  4 Sheets-Sheet 4

INVENTOR
JOHN M. SLATER
BY
Herbert B. Thompson
his ATTORNEY.

Patented May 6, 1952

2,595,309

UNITED STATES PATENT OFFICE 2,595,309

FLIGHT CONTROL APPARATUS FOR AIRCRAFT

John M. Slater, Garden City, N. Y., assignor to The Sperry Corporation, a corporation of Delaware Application June 26, 1946, Serial No. 679,376

16 Claims. (Cl. 244—77)

This invention relates to flight control apparatus for aircraft, and more particularly to apparatus whereby an aircraft is controlled in turns and other maneuvers, as well as in straight flight, by reference to accelerations which affect aircraft in flight.

Apparatus for controlling the flight of an aircraft ordinarily includes means affording primary references, for example a directional gyro or gyromagnetic compass and a gyro vertical, and servo systems controlled thereby for applying restoring moments to the aircraft through the agency of the rudder, elevator and ailerons. Upon deviation of the aircraft from predetermined heading or attitude, as measured by the gyro instruments, these control surfaces are automatically operated in a sense to restore the previous heading or attitude. Flight control apparatus using only the above elements can be made to stabilize the aircraft in straight and level flight or in simple maneuvers such as climbing or gliding. A coordinated turn requires that an aircraft be maintained free from sideslip or skid and that loss of altitude and air speed be prevented. Execution of turns and other maneuvers is essentially a dynamical problem, involving measurement and balancing of forces and accelerations active on the aircraft, and a mere knowledge of the relation of the aircraft to the earth, which is the information that the conventional gyros yield, is not always sufficient to permit accurate control of these forces and accelerations.

The present invention is based on the principle of measuring accelerations of the aircraft along two axes lying in a plane at right angles to the direction of flight, and lying at right angles or to some other angle with respect to each other, and controlling the aircraft to maintain these accelerations at the value they should have for any given maneuver. Thus, the aircraft is in effect locked against vertical or lateral translation, resulting in a correctly executed maneuver.

The invention is especially useful in performing coordinated turns, the most frequent maneuver. According to one embodiment of the invention, apparatus is provided for controlling the aircraft to maintain the transverse horizontal acceleration, or centripetal acceleration, at some predetermined value with respect to the angle of bank, thereby insuring that the aircraft continues in the turn at the radius that is correct for the bank angle selected, without undergoing any radial movement, which is manifest as skid. Furthermore, the true vertical acceleration is measured and is maintained equal to the acceleration of gravity to prevent altitude changes. If, then, the longitudinal acceleration is kept zero by known means, as by air speed control, a completely coordinated turn is assured under any condition of bank angle, rate of turn, air speed, or altitude.

In one embodiment of the invention a pair of accelerometers is provided, stabilized respectively to respond only to substantially vertical and to substantially horizontal accelerations. The accelerometers are arranged to control the attitude of the aircraft through signal responsive systems operative on the elevator and rudder or other equivalent control members. Means are provided for shifting the datum of the horizontal accelerometer by an amount corresponding to the bank angle. As the aircraft is rolled into a turn the datum is simultaneously shifted, whereupon the aircraft flies with respect to the predetermined horizontal acceleration while the vertical acceleration is maintained equal to that of gravity.

In another embodiment of the invention, one accelerometer is stabilized vertically and the other is arranged to detect accelerations parallel to the transverse axis of the aircraft. The aircraft is flown to zero acceleration as measured by the second accelerometer, and to an acceleration equal to that of gravity as measured by the first. As in the other embodiment of the invention this combination prevents transverse accelerations other than those inherent in a correct turn.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the accompanying drawings, embodiments of apparatus within the purview of the invention are illustrated.

An aircraft in straight and level unaccelerated flight represents an equilibrium of forces wherein thrust, as furnished by the propeller, is balanced by the drag that is due to air friction, and weight balanced by lift. To make a turn, it is required to establish a horizontal component of lift in order to divert the aircraft from its straight course and hold it in a curved course. This is accomplished by banking the aircraft so that the aircraft can, in effect, push horizontally against the air. At the same time, if loss of altitude is to be prevented it is necessary to increase the lift to keep the vertical component sufficient to balance gravity.

Figure 1:
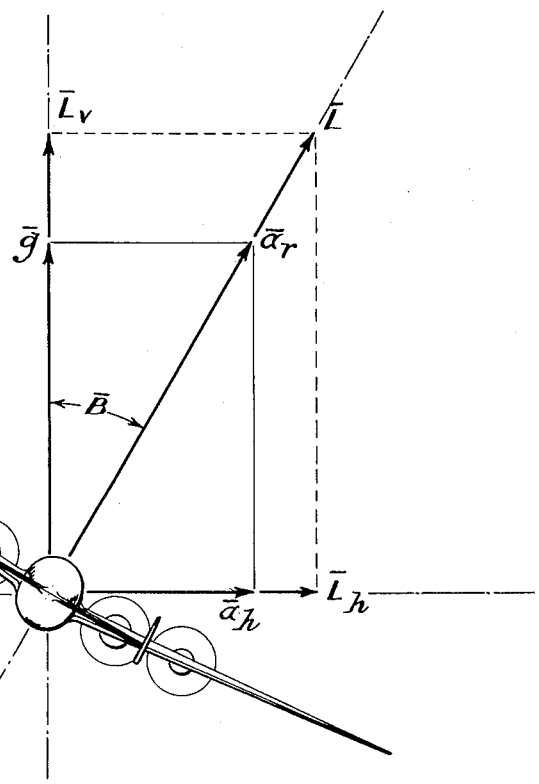
Fig. 1 is a diagrammatic illustration of principles on which the invention is based.

In Fig. 1 an aircraft is shown in a right turn as viewed from astern. It is banked to some angle B, thereby swinging the lift vector and establishing a horizontal component of lift $L_h$, which represents the centripetal force. At the same time, the lift L is assumed to be increased, as by opening the throttle, to keep the vertical component $L_v$ constant and equal numerically to the weight of the aircraft. The aircraft is now subject to a resultant acceleration $a_r$, which may be regarded as composed of a vertical component $g$ (the acceleration of gravity) and a horizontal component $a_h$, the centripetal acceleration.

The relationship between bank angle, the acceleration of gravity, and centripetal acceleration, may be expressed by the equation $B = \tan^{-1} a_h/g$, which may be regarded as the basic equation of turn control requirements.

Figure 2:
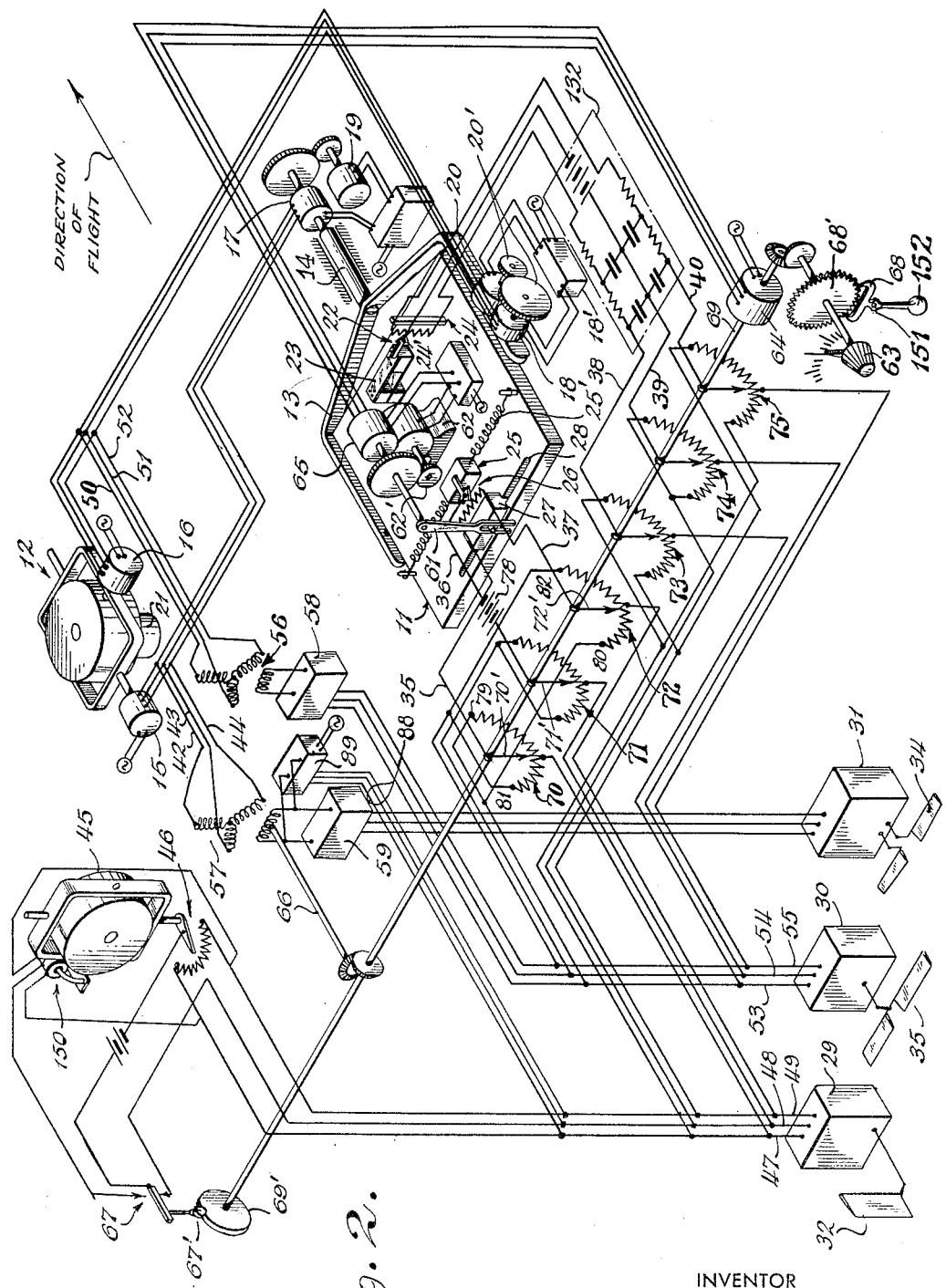
Fig. 2 is a diagrammatic view of one embodiment of the invention, involving measurement of centrifugal and vertical accelerations by means of gyro-stabilized accelerometers.

In Fig. 2 is shown one system of apparatus for satisfying the foregoing relation and thereby assuring a coordinated turn.

A platform 11 is provided, mounted in a gimbal member 13 the outer pivot axis 14 of which is arranged parallel to the longitudinal axis of an aircraft. The platform is stabilized in a horizontal plane from a gyro vertical 12, by servo means of well-known kind, including synchros 15, 16 of "Selsyn" or other type, on the roll and pitch axes of the gyro, corresponding synchros 17, 18 on the roll and pitch axes of the stable platform, and motors 19 and 20 receiving amplified signals from synchros 17, 18 and operative to move the platform synchronizing it with the gyro. The gyro is maintained vertical by any suitable erection system, for example a conventional air flipper erector as shown at 21.

Platform 11 remains horizontal at all times, during turns and other maneuvers of the aircraft. Mounted on the platform is a vertical accelerometer, shown as a weight 22 supported by springs 23 which constrain it to vertical translation. It has a pickoff shown as a potentiometer 24 the brush 24' of which is carried by the weight 22. The pickoff is adjusted so that in the absence of vertical accelerations other than that of gravity the output of the pickoff is zero. On change of acceleration a signal appears of amplitude and polarity corresponding to the magnitude and sense of the change.

Similarly mounted on the platform 11 is a horizontal accelerometer including a spring-supported weight 25 and pickoff 26. The pickoff is mounted on a block 27 so that it can slide in a slot 28 to change the datum or reference point as described below. The accelerometers are damped by any suitable means, as by surrounding them with viscous liquid so that they are relatively insensitive to short-period bumps but responsive to disturbances that persist for several seconds.

Servo systems of conventional construction are provided at 29, 30 and 31 for control of the rudder 32, elevator 33 and ailerons 34. They consist of servomotors operatively connected to the control surfaces, and each is controlled by a suitable relay capable of being actuated by the signals supplied thereto. The rudder servo system is controlled by accelerometer 25 through pickoff leads 35, 36, 37 through a circuit to be described. The elevator system is controlled by potentiometer 24 through leads 38, 39, 40 and the aileron system from the gyro vertical bank pickoff (synchro 15) through leads 42, 43, 44. The electrical connections are such that departure of the aircraft from predetermined bank angle results in corrective aileron, and deviation of either horizontal or vertical acceleration results in application of rudder or elevator in a sense to arrest the deviation. The rudder is additionally controlled, in straight flight, from a directional reference shown as a gyro 45 with a pickoff 46, the output of which is delivered to the rudder servo system at 47, 48, 49. The elevator is additionally controlled from synchro 16 through leads 50, 51, 52 delivering to leads 53, 54, 55. Course-changing synchros 56, 57 are interposed in the gyro pitch and roll signal output circuits, as shown, to permit adjustment of attitude of the aircraft, and, in the system shown, amplifiers 58, 59 are interposed in order to convert the reversible phase A. C. output of the "Selsyn" pickoff system to reversible polarity D. C. for application to the servo systems.

The datum of accelerometer 25 is shiftable by means of a fork 61, driven by a motor 62 on the platform which is controlled by a turn knob 63, through the agency of a known kind of synchro circuit 64, 65. Adjustment of the knob causes a synchronous movement of the fork, so that the block 27 is shifted by an amount proportional to the tangent of the bank angle predetermined by the setting of knob 63 the displacement of the block 27, being proportional to the tangent of the angle through which the fork 61 is rotated. The knob is arranged, on being moved away from a central position, to set in a bank signal at synchro 57 through the mechanical connection 66 and to break the directional gyro rudder control circuit at switch 67.

A speed limiting device in the form of tong 68 is provided for knob shaft 69 to limit the rapidity with which the aviator can cause a turn, to a value that the aircraft can closely follow the control signals from the accelerometers. One end of the tong 68 will engage with one side of the gear segment of gear 68' and by being displaced about the pivot point 151 will thereby cause the weight 152 to be similarly displaced. Upon repeated displacements of the knob 63 the weight 152 will similarly oscillate and act to replace the tong 68 free from the gear 68' thereby limiting the speed with which the knob 63 may be rotated.

In the operation of the system so far described, in straight and level flight the aircraft is controlled to zero horizontal acceleration and to a vertical acceleration of one g. When the knob is twisted to make a turn the aircraft is rolled over by the ailerons to the bank angle predetermined by the knob setting. At the same time pickoff 26 is shifted proportionally to the tangent of the bank angle. Thus accelerometer 25 demands rudder until the rate of turn is such that the horizontal acceleration is equal to gravity times the tangent of the bank angle. At this stage the accelerometer weight has assumed the laterally displaced position shown, and the rudder signal becomes zero. The aircraft turns until the knob 63 is restored to center. During the turn accelerometer 22 maintains lift by controlling the elevator.

Some aircraft have the property that on rolling into or out of a turn a yaw occurs in opposite sense to that of the turn. In order to overcome this so called adverse yaw it is desirable to supply some signal to the rudder corresponding to rate of roll. This is conveniently done by an electrical connection 88 between the gyro roll pickoff circuit and the rudder circuit. An isolation device 89 such as a vacuum tube is provided to permit flow of signal in the proper direction.

The system thus far described constitutes a complete system, capable of making excellently coordinated turns at moderate bank angles and passably coordinated turns at large bank angles. However, for the best possible performance, it is desirable to include means for taking into account the fact that the stabilized references (i. e. the accelerometers) control the aircraft through the agency of unstabilized control surfaces. Thus in a steeply banked turn, say at an angle B equal to 60 to 70 degrees, the functions of elevator and rudder are more or less interchanged. The elevator becomes an agent for correcting the horizontal acceleration and the rudder one for correcting vertical acceleration. Accordingly, sets of potentiometers 70 to 72 and 73 to 75 are provided, operated by the turn knob shaft 69 and adapted to divert part of the signals from the vertical accelerometer to the rudder servo system, and part of the signals from the horizontal accelerometer to the elevator system, to an extent increasing with bank angle. Thus in a 45-degree banked turn for example the signal from accelerometer 22 is applied approximately equally to the elevator and to the rudder, and that from accelerometer 25 is similarly divided.

If during a steep turn the vertical accelerometer 22 detects a downward acceleration it must demand left-rudder if the aircraft is making a right turn, and right-rudder if the aircraft is making a left turn, but must demand up-elevator in either case. Thus, the part of the vertical-accelerometer signal which goes to the rudder should be reversed depending on the sense of turn, and similarly that portion of the horizontal-accelerometer signal which is diverted to the elevator is reversed, depending on the sense of turn. Accordingly the circuit is such that movement of the potentiometer wipers from one side of the center taps to the other reverses the polarity of the connection between battery 78 and the elevator servo circuit leads, but does not reverse the polarity of the connection between the battery and the rudder servo circuit leads. Potentiometers 70, 71 and 72 have their wipers connected to the accelerometer leads 35, 36, 37. The ends of potentiometer 71 are connected to the center lead 54 of the elevator servo circuit. Thus, in central position all the voltage from battery 78 goes to the rudder servo circuit, but when the knob is moved either for a right or left turn an increasing proportion is diverted to the elevator servo circuit. Ends 79 and 80, of potentiometers 70, 72 are connected to one elevator servo lead 53, and the other potentiometer ends 81, 82 are connected to the other elevator servo lead 55. The center taps 83, 84 are connected to rudder servo leads 47, 49.

The functioning of the circuit becomes more apparent in considering actions taking place during a right turn for example. If the turn is properly coordinated the signal output of the horizontal accelerometer will be zero. A slight signal may occur from the vertical accelerometer, if the aircraft is tending to lose altitude, this signal being sufficient to hold up-elevator to overcome this effect. However, if air speed is kept up properly this signal will be very small. If, for any reason, the turn becomes tighter than it should, the centrifugal acceleration will increase; weight 25 moves outwardly away from the position shown and a signal appears at 35—37. At a bank angle of less than 45 degrees most of this signal goes to the rudder, via leads 35, 83, 47 and 37, 84, 49, and a minor part to the elevator via leads 35, 79, 53 and 37, 82, 55. The signals are in a sense to cause left rudder and down elevator, so as to decrease the curvature of the turn.

On the other hand when the aircraft is making a left turn, if the turn tightens the block moves to the right, resulting in a signal of opposite polarity to that in the case above. The signal goes to the rudder and elevator servos in a sense to cause right rudder and down elevator.

The control circuit from the vertical accelerometer 22 is the exact counterpart of that described, and requires no detailed description. Potentiometers 73—75 serve to divide the accelerometer signal between elevator and rudder servos, in a proportion depending on bank angle, and to insure that the part of the accelerometer signal that goes to the elevator always works in the same sense for a given sense of displacement of the accelerometer, while the part that goes to the rudder is reversed depending on the sense of turn.

With the arrangement described, well-coordinated turns are possible even at very large bank angles. The system described flies an aircraft to a predetermined bank angle. The rate of turn adjusts itself to whatever value makes the product of rate of turn and air speed—that is, the centripetal acceleration—correct for the particular bank angle. High air speeds are automatically associated with low rates of turn, which is advantageous in point of safety, since the aviator cannot inadvertently demand a rate of turn which would be dangerously high for his air speed.

The various accelerometers described tend to stabilize the aircraft to particular accelerations. If the accelerometers are sufficiently sensitive and the servo systems sufficiently tight, translational movement of the aircraft other than in the direction of flight is substantially prevented. However, should the aircraft for any reason get into a steady sideslip or skid the accelerometers themselves will not stop the sideslip or skid, because they do not respond to velocities or to displacements. Accordingly it is desirable in some cases to include single integrating means for the accelerometer's output, to obtain control signals proportional to rate of change or sideslip or skid or rate of change of altitude, or double integrating means to obtain control signals proportional to the actual displacement; for example a signal corresponding to the change in altitude experienced as the result of an upgust. Fig. 2 illustrates integrating means as applied to the vertical accelerometer. Thus, a double-integration network of well-known type is included in the leads 38, 39 and 40 from the vertical accelerometer 22. If an upgust accelerates the aircraft upwardly and carries it a few feet, the accelerometer at the initiation of the upward movement signals for down-elevator, and the resistance-capacitance network 132 causes the elevator to be held down during the period of discharge of the condensers through the resistances until the aircraft has returned to approximately its original altitude and the signal from the accelerometer pick-off is zeroed. Similar integrating networks, of one or more stages of integration, can be incorporated in the output circuits of the other accelerometers.

The acceleration measured by accelerometer 25 in the apparatus of Fig. 2 is not sideslip or skid acceleration if these terms are understood to mean movement of the aircraft in a direction parallel to the wing when banked. Accelerometer 25 measures accelerations in a horizontal direction which is the direction of the radius of the turn, and thus controls the aircraft in a manner to keep the radius constant, to prevent horizontal shifting of the aircraft. This is a desirable feature because the turn is coordinated in a uniform manner whatever the attitude of the aircraft, even in the extreme case of a 90-degree bank or a steep climbing turn. The acceleration measurements, which serve to guide the aircraft in a turn, are completely independent of the attitude of the aircraft.

In another embodiment of the invention sideslip or skid is measured in lieu of horizontal acceleration. Thus, the accelerations measured and used for turn coordination are vertical acceleration, and acceleration in a direction parallel to the transverse axis of the aircraft. This system functions in similar fashion to the system of Fig. 2 for turns at moderate bank angles. Only one accelerometer, the vertical one, is stabilized; furthermore neither accelerometers require a shifting of datums to operate as null instruments.

Figure 3:
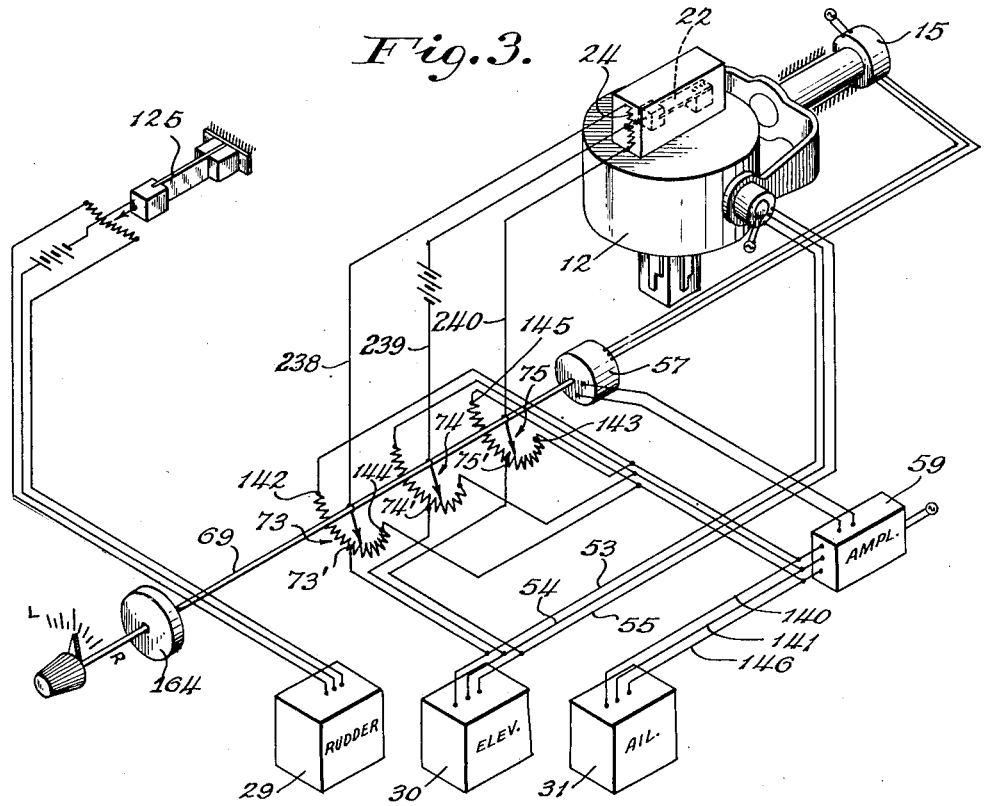
Fig. 3 is a diagrammatic view of a modified apparatus involving measurement of vertical acceleration by means of a gyro-stabilized accelerometer, and measurement of acceleration parallel to the transverse axis of the aircraft.

This simplified system is shown in Fig. 3. The horizontal accelerometer 125 is mounted in fixed relation to the aircraft to measure transverse acceleration, that is, acceleration in a direction parallel to the line joining the wing tips. It controls the rudder directly, without the intermediary of any system for dividing signals. The vertical accelerometer 22, in a liquid-filled box, is stabilized by direct mounting on the gyro vertical 9 and controls the elevator through leads 238, 239, 240, 53, 54 and 55.

In some modern aircraft the fuselage itself has little lifting power, and in a steeply banked turn the rudder is not a very effective means for changing the vertical component of lift of the aircraft. With such aircraft it is best and safest to correct a decrease of lift (downward acceleration) by unbanking the aircraft until lift is restored. This expedient is shown in Fig. 3. Potentiometers 73, 74, 75 are provided as in Fig. 2, but they are arranged to divide the vertical-accelerometer signal between the elevator and the ailerons, in a ratio depending on bank angle, in such a manner that a decrease of lift is corrected partly by causing down-elevator and partly by lessening the bank angle. Thus, the center tap of potentiometer 74 is connected to elevator lead 54 and the ends of the potentiometer are connected to aileron lead 140. The center taps of potentiometers 73 and 75 go to elevator leads 53, 55. The ends 142, 143 of these potentiometers are connected to aileron lead 140 and the other ends 144, 145 to aileron lead 146. With this circuit, at zero bank angle all the signal from accelerometer 22 goes to the elevator and with increasing bank angle an increasing proportion of signal is diverted to the ailerons, as a biasing signal to the bank signal set by synchro 57. The circuit functions to cause movement of the ailerons in the correct sense whether the turn be right or left.

In operation, both in straight flight and in turns the vertical accelerometer causes application of control moments, via the elevator and ailerons, to keep the acceleration constant and equal to $g$, thereby tending to prevent change of altitude of the aircraft. The accelerometer acts as a safety device, in that it tends to reduce a preset bank angle when the bank angle is so steep as to cause downward acceleration of the aircraft. Thus stalling conditions are prevented. The transverse accelerometer tends to keep the acceleration, in a direction parallel to the line joining the wing tips, equal to zero. It is thus effective to suppress radial movement of the aircraft in a turn. The effectiveness for this purpose decreases with increase of bank angle, and becomes zero at the 90-degree bank. For aircraft in which very steep turns are to be made under automatic control the apparatus of Fig. 2 is superior, as its effectiveness to prevent radial movement of the aircraft is constant at all bank angles.

Figure 4:
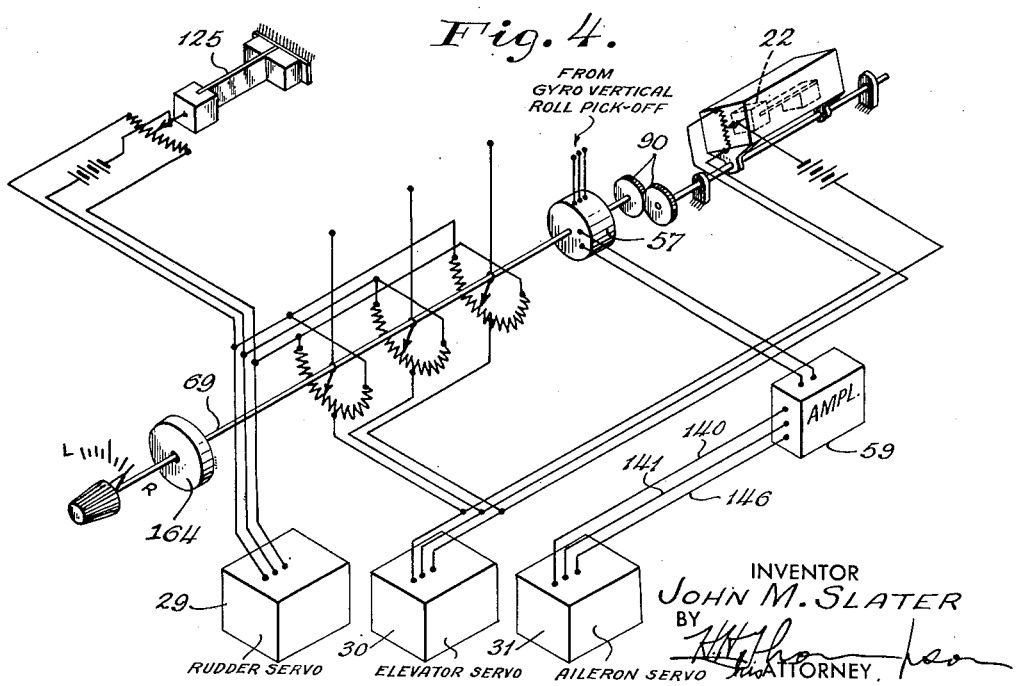
Fig. 4 is a view of a simplified modification of the apparatus of Fig. 3, wherein the vertical accelerometer is stabilized indirectly.

The apparatus of Figs. 2 and 3 can be simplified by dispensing with direct gyro stabilization of the accelerometers. However, this simplified version is only effective in an aircraft that has other means for entering into a turn, as the operation presupposes a turning and banked aircraft. Thus, the craft may be entered into a turn in response to a signal emanating from a gyro pickoff and transmitted through a Selsyn 57 to the aircraft's aileron servo system. If the accelerometers are twisted manually to an angle equal and opposite to the bank angle, the aircraft will adjust itself until the accelerometers are satisfied—that is, until both accelerometers read zero in Fig. 3, for example. The accelerometers are, in fact, stabilized, but indirectly so, through the intermediary of the aircraft, rather than directly by the gyro vertical. Fig. 4 shows a simplified form of the apparatus of Fig. 3 using this principle. The vertical accelerometer 22 is rotated, by gears 90, equally and oppositely to movement of the turn knob shaft 69. When the aircraft reaches equilibrium in the turn the accelerometer will be truly vertical, since the aircraft will have banked to an angle equal and opposite to that of the initial displacement of the accelerometer. Limit means 164 limits the rate at which the aircraft can be put into the turn, to a moderate value such that the accelerometer remains substantially vertical throughout the turn.

In the apparatus of Fig. 4 the vertical accelerometer is stabilized only in roll and not in pitch. Its action is theoretically correct, therefore, only in level (constant altitude) turns. However, as most turns are made either level or at a moderate angle of climb or glide, the apparatus is useful.

Figure 5:
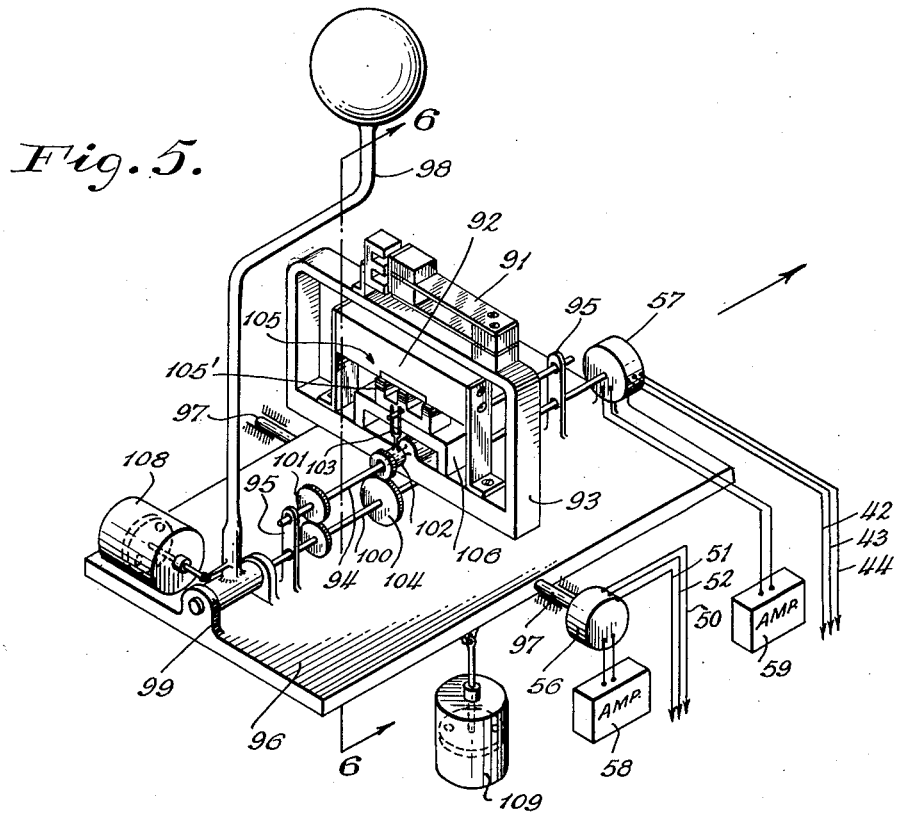
Fig. 5 is a view of a simplified modification of the apparatus of Fig. 2, wherein both accelerometers are stabilized indirectly.

Fig. 5 illustrates a manner of applying the principles of Fig. 4 to the apparatus of Fig. 2. The two accelerometers 91, 92 are mounted on a frame 93 mounted on an angle 94 for rotation about an axis normally parallel to the direction of flight in brackets 95 attached to a platform 96 pivoted at 97 for movement about the transverse axis of the aircraft. A miniature joystick 98 is provided, pivoted in bearings 99 and connected to a shaft 100 which is connected to shaft 94 through gearing 101 so that movement of the joystick to the right, for example, moves frame 93 an equal angle to the left. A bushing 102 carrying a fork 103 is mounted loosely on shaft 94 so that it can turn relative to this shaft. The bushing is movable from shaft 100 through 2-to-1 reduction gears 104, so that on movement of the joystick to the right the fork is moved to the left. Such movement displaces the pickoff 105 of accelerometer 92 to the left, this pickoff being mounted on a sliding block 106 analogous to block 27 in Fig. 2.

The accelerometers are shown as provided with electromagnetic pickoffs, of the E-type, more fully described in Wittkuhns 1,959,804, and includes E-shaped wound iron armatures cooperating with iron pole pieces. Any other suitable pickoff may be used. The rest of the turn control circuit is similar to that shown in Fig. 2 and is omitted from Fig. 5. The accelerometers control the rudder and elevator through circuits as in Fig. 2.

The transverse pivot 97 of platforms 96 is arranged to operate the elevator trim synchro 56 of Fig. 2, and axle 100 operates the aileron trim synchro 57. Thus by moving the joystick to the right or left, turns are made; by moving it backward or forward the aircraft is caused to climb or glide. Dashpots 108, 109 are provided to limit the rapidity with which the joystick can affect the mechanism so that the platform 96 remains substantially horizontal in turns and other maneuvers. The joystick is advantageously made rather flexible so that it can be pushed hard over if desired.

Figure 6:
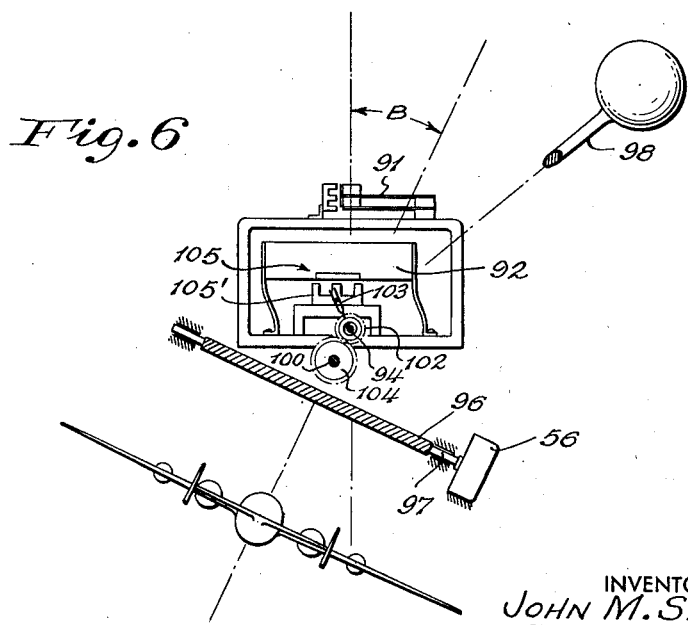
Fig. 6 is a sectional view taken in about the plane 6—6 of Fig. 5, showing the disposition of parts during a right turn.

Fig. 6 represents the disposition of parts in the apparatus of Fig. 5 during any part of a correctly coordinated right turn. The horizontal accelerometer output reads substantially zero, the deflection of the weight 92 being matched by the displacement of the pickoff. The joystick is kept deflected during the turn. To stop the turn and level off the joystick is returned to zero position as shown in Fig. 5.

Figure 7:
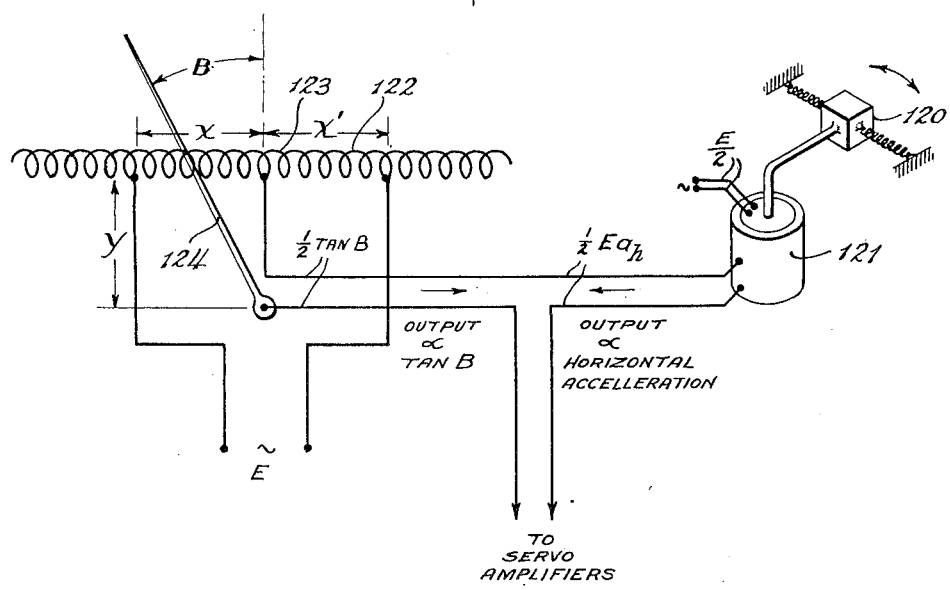
Fig. 7 is a view of an alternative modification of part of the apparatus of Fig. 2.

The apparatus of Fig. 7 illustrates an alternative method of producing an output signal in accordance with discrepancies that may exist between a signal produced in response to accelerations in the aircraft's longitudinal axis, and a signal that is proportional to the tangent of the angle of bank. Thus, in Fig. 7 a horizontally stabilized accelerometer 120 is operatively connected to a two-phase linear Selsyn 121. An open coil autotransformer 122 is rigidly attached to the aircraft and has supplied to it a voltage E. In order to provide a directional-sensitive device, the voltage E is applied at a distance from the center tap 123 equal to the distance Y—which is the length of the lever arm of wiper 124 which is stabilized by a gyro or other means, and may be similar to the gyro of Fig. 2. Thus, as the wiper 124 moves across the coil 122, a sense responsive signal will be produced, and being applied in series opposition to the signal from the Selsyn 121 the resulting output will afford a measure of deviations in horizontal accelerations, and this signal when transmitted to appropriate servo mechanisms may manipulate the craft in a manner to erase the signal.

Directional control of the craft is not in itself a part of the invention. In the apparatus of Fig. 2, the directional gyro 45 may be of any conventional type. With the construction shown it is desirable during the turn to apply the output of pickoff 46 to a torquer 150 of known center-tapped coil and magnet type, so that during the turn the gyro precesses in synchronism with the aircraft. Switch 67 performs this operation by making contact at 151 when cam 69' is away from detent position.

While the apparatus of the invention has been described in reference to control of an aircraft through the agency of the conventional rudder, elevator and ailerons, it is not restricted to such systems. Thus, the circuits wherein signals from stabilized control elements are divided between unstabilized control elements, in proportion to the degree of unstabilization (i. e. the angle of bank) are useful in aircraft wherein spoilers, servo tabs and other unstabilized control devices are used in addition to or in place of the conventional control surfaces.

While it may be desirable to locate the accelerometers close to the center of gravity of the aircraft to minimize disturbance due to angular accelerations, since the accelerometers are rather heavily damped, this requirement is not very rigorous.

All forms of the invention can be simplified by omitting the gyro vertical, the aircraft being banked by visual reference to the horizon or to an artificial horizon.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In aircraft flight control apparatus, a horizontally stabilized accelerometer, signal producing means for said accelerometer having an adjustable output, and means for compensating the output signal of said signal producing means for the value of a predetermined horizontal acceleration such that the accelerometer signal output will correspond to deviations in horizontal accelerations from said predetermined value.

2. In flight control apparatus, a vertically stabilized signal producing craft acceleration measuring means, signal producing acceleration measuring means responsive to translational accelerations in a plane other than vertical and along an axis lying in a plane at right angles to the longitudinal axis of the aircraft, means for applying control moments to the aircraft, and means responsive to the signals of the acceleration measuring means and arranged to operate the control moment applying means in a sense to counteract changes in the acceleration measured.

3. In an aircraft flight control apparatus including pitch and yaw control means, a stabilized accelerometer having a signal output responsive to craft accelerations, and means adjustable in accordance with craft bank angle for dividing the application of the accelerometer signal output to the pitch and yaw control means in a ratio dependent upon the bank angle.

4. In an aircraft flight control apparatus, stabilized accelerometer means (I) having a signal output responsive to aircraft movements about a horizontal axis transverse to the line of flight, stabilized accelerometer means (II) having a signal output responsive to aircraft movements about a vertical axis, unstabilized signal responsive control means (III) for applying control moments to the craft about its transverse axis, unstabilized signal responsive control means (IV) for applying control moments to the craft about an axis normal to both the transverse axis and the line of flight, and means adjustable in accordance with craft bank angle for applying control signals from means (I) to means (III) and (IV) in a ratio varying inversely with bank angle and from means (II) to means (IV) and (III) in a ratio varying with bank angle.

5. In an aircraft having elevator and rudder servo means, stabilized means responsive to initiation of transverse horizontal movement of the aircraft and producing control signals for control of the aircraft with respect to movement about a vertical axis, means for supplying control signals from said stabilized means to the rudder servo means in a sense to cause right-rudder on initiation of left movement of the aircraft and left rudder on initiation of right movement, and means responsive to sense of turn of the aircraft for supplying control signals from said stabilized means to the elevator servo means in a sense to cause up-elevator on initiation of left movement during a right turn and down-elevator on initiation of left movement during a left turn.

6. In an aircraft having elevator servo means and rudder servo means, a vertically stabilized signal-producing accelerometer, a horizontally stabilized signal-producing accelerometer, circuit means for applying the signal from the vertical accelerometer to the elevator and the rudder servo means in adjustable ratio, and circuit means for applying the signal from the horizontal accelerometer to the rudder servo means in a substantially inverse ratio to the signal from the vertically stabilized accelerometer.

7. In an aircraft flight control apparatus, an accelerometer normally responsive to accelerations in a vertical direction and arranged to produce zero signal when the acceleration is substantially one g. and to produce a signal dependent on the amount and sense of change of acceleration from this value, a servo system to control the craft in a manner to increase or decrease the vertical acceleration of the craft depending on the sense of operation of the servo system, an operative connection between the accelerometer and the servo system such that variation in measured acceleration causes the servo means to control the craft to decrease the variation of acceleration, and means for inclining the accelerometer with respect to the aircraft.

8. In an aircraft flight control system, an accelerometer, a pickoff to produce a signal on occurrence of an acceleration differing from a predetermined value, mechanical means for angularly displacing the accelerometer relative to the earth, a servo system to control the aircraft in a manner to change the acceleration thereof, and an operative connection between the accelerometer and the servo system to cause application of control in a sense to reduce the accelerometer signal.

9. In an aircraft flight control apparatus, an accelerometer normally responsive to accelerations in a horizontal direction, an adjustable signal pickoff therefor adjustable to vary the acceleration value at which the pickoff signal is zero, a servo system operable to control the aircraft to vary the horizontal acceleration depending on the sense of operation of the servo system, an operative connection between the pickoff and the servo system whereby changes in measured horizontal acceleration result in reciprocal changes in horizontal acceleration of the aircraft, and means for simultaneously inclining said accelerometer with respect to the aircraft and adjusting the pickoff by an amount proportional substantially to the tangent of the angle of inclination.

10. In an aircraft, lift control apparatus including means responsive to vertical acceleration and operative to produce a signal on departure of the vertical acceleration from a predetermined value, servo means responsive to said signal for adjusting the bank angle of the aircraft, and means for supplying signals from the acceleration responsive means to the servo means in a sense to vary the bank angle in accordance with departures of vertical accelerations from the predetermined values.

11. In an aircraft, lift control apparatus comprising means responsive to vertical acceleration and operative to produce a signal on departure of the vertical acceleration from a predetermined value, servo means responsive to said signal to change the lift of the aircraft, and a circuit for supplying signals from the accelerometer to the servo means and including means for doubly integrating the accelerometer signal to produce a displacement signal, whereby the servo means are operated in accordance with said displacement signal.

12. In aircraft flight control apparatus, the combination with an aircraft having a rudder control surface for controlling craft movements in yaw, operating means for said rudder, signal-responsive means for controlling said operating means, means for effecting a bank attitude of the craft to produce a desired rate of turn thereof, an acceleration-responsive means disposed to respond to transverse accelerations of the craft, signal-supplying pick-off means associated with said acceleration-responsive means and connected with said signal-responsive means, and means for compensating the signal output of said pick-off means for the value of horizontal acceleration at desired rates of turn whereby said acceleration-responsive means will operate said rudder to correct for deviations in horizontal accelerations from that corresponding to a desired rate of turn.

13. In aircraft flight control apparatus, the combination with an aircraft having a rudder control surface for controlling craft movements in yaw, operating means for said rudder, signal-responsive means for controlling said operating means, acceleration-responsive means including an associated pick-off means connected with said signal-responsive means for controlling said rudder, means for tiltably supporting said acceleration-responsive means, means including manually operable means for effecting a bank attitude of the craft to produce a desired rate of turn thereof, and a motion transmitting mechanism responsive to said manually operable means for tilting said acceleration-responsive means in the opposite direction and through an angle substantially equal to the roll of the craft to the desired bank attitude.

14. In flight control apparatus for aircraft, an aircraft having a first control surface for controlling movements of said aircraft about a first axis of said craft and a first signal-responsive operating means for said surface, a second control surface for controlling movements of said craft about a second axis thereof, and a second signal-responsive operating means for said second control surface, means including an accelerometer for providing a signal output in accordance with craft accelerations, means for causing the craft to bank and produce a desired rate of turn, and means associated with said last mentioned means for dividing said signal output between said first and second control-surface operating means in amounts dependent upon the setting of said bank-causing means.

15. In flight control apparatus for aircraft, an aircraft having a first control surface for controlling movements of said aircraft about a first axis of said craft and a first signal-responsive operating means for said surface, a second control surface for controlling movements of said craft about a second axis thereof normal to said first axis and a second signal-responsive operating means for said second control surface, means including an accelerometer for providing a signal output in accordance with craft accelerations, means for causing the craft to rotate about a third axis normal to said first and second axes and means associated with said last mentioned means for dividing said signal output between said first and second control-surface operating means in amounts dependent upon the setting of said rotation-causing means.

16. In aircraft flight control apparatus, the combination with an aircraft having a control surface for controlling craft movements in yaw, operating means for said control surface, signal-responsive means for controlling said operating means, a stabilized linear accelerometer disposed to respond to linear horizontal accelerations occurring transversely of said craft, signal-supplying pick-off means associated with said accelerometer and connected with said signal-responsive means, and means for compensating the signal output of said pick-off means for the value of the horizontal acceleration at desired rates of turn whereby said accelerometer will operate said control surface to correct for deviation in horizontal accelerations from that corresponding to a desired rate of turn.

JOHN M. SLATER.

REFERENCES CITED

The following references are of record in the file of this patent:

UNITED STATES PATENTS

| Number | Name | Date |
|---|---|---|
| 1,801,948 | Boykow | Apr. 21, 1931 |
| 1,992,970 | Sperry et al. | Mar. 5, 1935 |
| 2,125,361 | Schwarzler | Aug. 2, 1938 |
| 2,293,886 | De Florez | Aug. 25, 1942 |
| 2,340,041 | Carlson | Jan. 25, 1944 |
| 2,386,777 | Bentley | Oct. 16, 1945 |
| 2,405,015 | Carlson | July 30, 1946 |

FOREIGN PATENTS

| Number | Country | Date |
|---|---|---|
| 619,055 | Germany | Sept. 23, 1935 |